United States Patent
Kondo (10) Patent No.: US 9,392,612 B2
(45) Date of Patent: Jul. 12, 2016

(54) CELL IDENTIFIER ALLOCATION METHOD, BASE STATION, MAINTENANCE SERVER, AND MOBILE COMMUNICATION SYSTEM

(75) Inventor: Takayuki Kondo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/352,997

(22) PCT Filed: Sep. 7, 2012

(86) PCT No.: PCT/JP2012/072911
§ 371 (c)(1),
(2), (4) Date: Apr. 18, 2014

(87) PCT Pub. No.: WO2013/077059
PCT Pub. Date: May 30, 2013

(65) Prior Publication Data
US 2014/0248896 A1    Sep. 4, 2014

(30) Foreign Application Priority Data

Nov. 25, 2011 (JP) .................................. 2011-257614

(51) Int. Cl.
*H04W 72/08* (2009.01)
*H04W 24/02* (2009.01)
*H04W 24/08* (2009.01)

(52) U.S. Cl.
CPC ............ *H04W 72/085* (2013.01); *H04W 24/02* (2013.01); *H04W 24/08* (2013.01); *Y02B 60/50* (2013.01)

(58) Field of Classification Search
None
See application file for complete search history.

(56) References Cited

U.S. PATENT DOCUMENTS

| 2010/0003998 | A1* | 1/2010 | Hamabe | H04W 16/12 455/452.1 |
| 2010/0020710 | A1* | 1/2010 | Gupta | H04J 11/0093 370/252 |
| 2010/0322109 | A1* | 12/2010 | Ahn | H04W 12/02 370/254 |
| 2012/0009957 | A1* | 1/2012 | Murasawa | H04W 8/26 455/507 |
| 2012/0052869 | A1* | 3/2012 | Lindoff | H04J 11/0069 455/452.1 |

FOREIGN PATENT DOCUMENTS

| JP | 09-055974 A | 2/1997 |
| JP | 2010-268463 A | 11/2010 |
| JP | 2011-109668 A | 6/2011 |

(Continued)

OTHER PUBLICATIONS

International Search Report (ISR) (PCT Form PCT/ISA/210), in PCT/JP2012/072911, dated Dec. 11, 2012.

(Continued)

*Primary Examiner* — Hilina K Demeter
(74) *Attorney, Agent, or Firm* — McGinn IP Law Group PLLC (57) ABSTRACT

A cell identifier allocation method includes: a measurement step of measuring the reception power or propagation loss of the signal received inside the target cell from each of the cells of adjacent base stations in the neighborhood of the target cell; an identification step of identifying the first cell that has the greatest reception power or the lowest propagation loss, from among the cells of the adjacent base stations; and, an allocation step of allocating a cell identifier in which the code sequence number of the synchronization signal is different from that of the first cell and that has not been allocated to any of the cells of the adjacent base stations, to the target cell.

18 Claims, 5 Drawing Sheets

(56) References Cited

FOREIGN PATENT DOCUMENTS

| | | |
|---|---|---|
| JP | 2011-124758 A | 6/2011 |
| JP | 2011-176471 A | 9/2011 |

OTHER PUBLICATIONS

3GPP TS36.211 V9. 1.0, Section 6.11 (Mar. 2010) $3^{rd}$ Generation Partnership Project: Technical Specification Group Radio Access Network; Evolved Universal Terrestrial Radio Access (E-UTRA); Physical Channels and Modulation (Release 9).

Extended European Search Report dated Aug. 7, 2015.

Vadada, Harish. LTE PCI Planning Sep. 1, 2010, XP-002742658 Retrieved from the Internet: URL:http://www.telecom-cloud.net/wp-content/uploads/2010/09/PCI-Planning-for-LTE.pdf [retrieved on Jul. 22, 2015].

\* cited by examiner

CELL IDENTIFIER ALLOCATION METHOD, BASE STATION, MAINTENANCE SERVER, AND MOBILE COMMUNICATION SYSTEM

TECHNICAL FIELD

The present invention relates to a technology for allocating a cell identifier to the cell of a base station.

BACKGROUND ART

In the mobile communication system in LTE (Long Term Evolution), a cell identifier called PCI (Physical Cell Identifier) is allocated to the cell of a base station (eNB: evolved Node B).

Here, description will be started with PCI (see Non-Patent Document 1).

PCIs in LTE include 504 unique physical-layer cell identifiers. The physical-layer cell identities are grouped into 168 unique physical-layer cell identity groups, each group including three unique identifiers. The physical-layer identity is uniquely defined as follows:

$$N_{ID}^{cell} = 3 N_{ID}^{(1)} + N_{ID}^{(2)} \quad \text{[Formula 1]}$$

Herein, $$N_{ID}^{(1)} \quad \text{[Formula 2]}$$

ranges from 0 to 167, corresponding to the physical-layer cell identity group.

Further, $$N_{ID}^{(2)} \quad \text{[Formula 3]}$$

ranges from 0 to 2, corresponding to the physical-layer cell identity in a certain physical-layer cell identity group.

Herein, three different physical-layer cell identities in the physical-layer cell identity group, i.e., $$N_{ID}^{(2)} \quad \text{[Formula 4]}$$

is used as a PSS (Primary Synchronization Signal) code sequence number (e.g., Zadoff-chu sequence used in LTE).

Next, the method of allocating PCI will be described.

The LTE mobile communication system is provided with a database for each base station in which PCIs and the like of the cells of the adjacent base stations in the neighborhood of the concerned base station have been registered. This database is arranged in, for example, a maintenance server.

When PCI is allocated to the target cell of the target base station, a PCI, that has not been allocated as the PCI of any of the cells of adjacent base stations in the neighborhood of the target base station, is allocated to the target cell.

Next description will be made on a cell search that is carried out by the mobile station.

The base station is transmitting, within its own cell, notification signals included with the PCI that has been allocated to the cell, to mobile stations residing in the cell.

The mobile station, based on PSS included in the PCI received from the cell, determines the timing of transmission at which the pilot signal is transmitted from the cell.

Then, the mobile station, in accordance with the determined timing of transmission, receives the pilot signal and measures the reception power of the received pilot signal.

Subsequently, the mobile station searches the cell that has the greatest reception power from among the cells whose reception power has been measured.

Thereafter, the mobile station acquires setup information for connection to the cell, from among the notification signal that is transmitted from the cell thus searched.

RELATED ART DOCUMENT

Non-Patent Document

Non-Patent Document 1: 3GPP TS36.211 V9. 1.0, Section 6.11 (2010-03)

SUMMARY OF THE INVENTION

Problems to be Solved by the Invention

As described above, in the LTE mobile communication system, when PCI is allocated to the target cell of the target base station, a PCI, that has not been allocated as the PCI of any of the cells of adjacent base stations in the neighborhood of the target base station, is allocated to the target cell.

However, as stated above, PCI has a structure that uses three different physical-layer cell identities in the physical-layer cell identity group as the PSS code sequence number.

As a result, the target cell may be allocated with the same PSS code sequence number despite the fact that a different PCI from those for the cells of the adjacent base stations is allocated.

In such a case, the orthogonality between PSSs is lowered between the cells that are allocated with the same PSS code sequence number, so that if the timings of transmissions of the two PSSs overlap, strong interference occurs between PSSs.

As a result, the mobile station receives strong interference from the PSS of the adjacent cell, posing a problem that the cell search performance will degrade.

It is therefore an object of the present invention to provide a cell identifier allocation method, base station, maintenance server, and mobile communication system that can solve the above problem.

Means for Solving the Problems

A first cell identifier allocation method of the present invention is a cell identifier allocation method for allocating a cell identifier to a target cell of a target base station among a plurality of base stations, comprising:

a measurement step of measuring the reception power or propagation loss of the signal received inside the target cell from each of the cells of adjacent base stations in the neighborhood of the target base station;

an identification step of identifying the first cell that has the greatest reception power or the lowest propagation loss, from among the cells of the adjacent base stations; and, an allocation step of allocating a cell identifier in which the code sequence number of the synchronization signal is different from that of the first cell and that has not been allocated to any of the cells of the adjacent base stations, to the target cell.

A second cell identifier allocation method of the present invention is a cell identifier allocation method for allocating a cell identifier to a target cell of a target base station among a plurality of base stations, comprising:

an identification step of identifying the first cell that produces the greatest interference against the target cell, from among the cells of the adjacent base stations in the neighborhood of the target base station; and, an allocation step of allocating a cell identifier in which the code sequence number of the synchronization signal is different from that of the first cell and that has not been allocated to any of the cells of the adjacent base stations, to the target cell.

A base station of the present invention is a base station that allocates a cell identifier to a target cell thereof, comprising:

a measuring unit that measures the reception power or propagation loss of the signal received inside the target cell from among the cells of the adjacent base stations in the neighborhood of its own station; and, an allocator that identifies the first cell that has the greatest reception power or the lowest propagation loss, from the cells of the adjacent base stations, and allocates a cell identifier in which the code sequence number of the synchronization signal is different from that of the first cell and that has not been allocated to any of the cells of the adjacent base stations, to the target cell.

A maintenance server of the present invention is a maintenance server that allocates a cell identifier to a target cell of a target base station among a plurality of base stations, comprising:

an allocator that identifies, from among the cells of the adjacent base stations in the neighborhood of the target base station, the first cell whose reception power of the signal received inside the target cell is the greatest or whose propagation loss of the signal received inside the target cell is the lowest, and allocates a cell identifier in which the code sequence number of the synchronization signal is different from that of the first cell and that has not been allocated to any of the cells of the adjacent base stations, to the target cell.

A mobile communication system of the present invention is a mobile communication system including a plurality of base stations and allocates a cell identifier to a target cell of a target base station among the plural base stations, comprising:

a measuring unit that measures the reception power or propagation loss of the signal received inside the target cell from each of the cells of the adjacent base stations in the neighborhood of the target base station; and, an allocator that identifies the first cell that has the greatest reception power or the lowest propagation loss, from among the cells of the adjacent base stations, and allocates a cell identifier in which the code sequence number of the synchronization signal is different from that of the first cell and that has not been allocated to any of the cells of the adjacent base stations, to the target cell.

Effect of the Invention

According to the present invention, the first cell that has the greatest reception power or the lowest propagation loss is identified from among the cells of adjacent base stations in the neighborhood of the target base station, and a PCI, in which the code sequence number of the synchronization signal is different from that of the first cell and that has not been allocated to any of the cells of the adjacent base stations, is allocated to the target cell.

Accordingly, the target cell shows high orthogonality between the synchronization signals of itself and that of the adjacent cell that is estimated to produce the strongest interference, and hence it receives less interfered from adjacent cell, so that it is possible to obtain the effect that degradation of the mobile station's cell search characteristic can be avoided.

MODE FOR CARRYING OUT THE INVENTION

The mode for carrying out the present invention will be described hereinbelow with reference to the drawings.

Here, description below will be given by taking an example in which the mobile communication system of the present invention is applied to the LTE mobile communication system.

(1) The First Exemplary Embodiment

Figure 1:
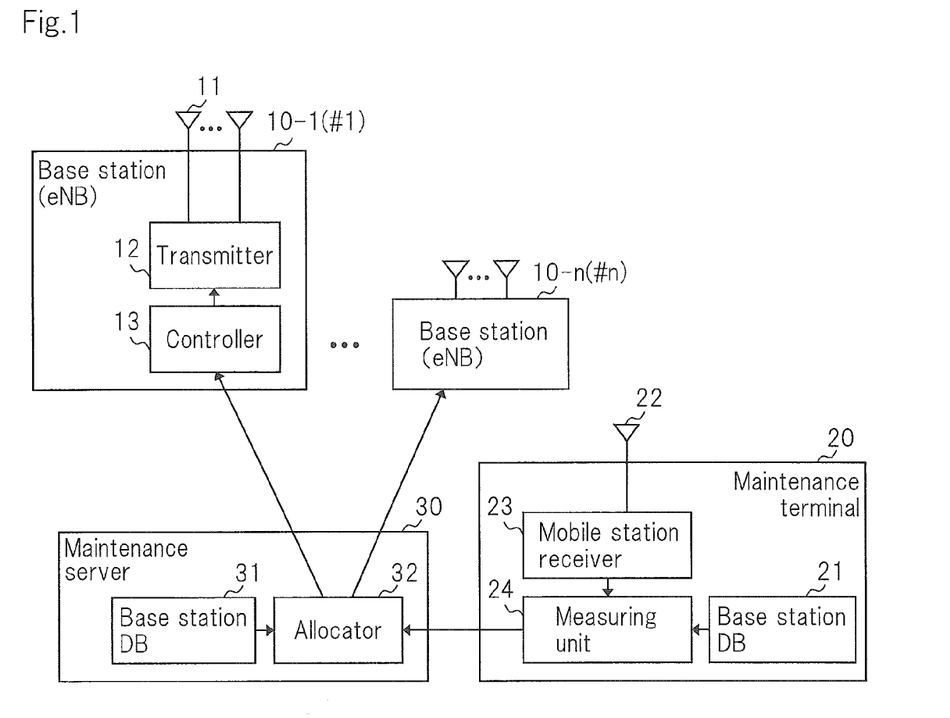
FIG. 1 A block diagram showing the configuration of a mobile communication system for the first to third exemplary embodiments of the present invention.

As shown in FIG. 1, the mobile communication system of the present exemplary embodiment includes n (n is an integer equal to or greater than 2) base stations (eNB) (#1~#n) 10-1~10-n (which will be called hereinbelow base station 10 if not otherwise specified), maintenance terminal 20 and maintenance server 30. In FIG. 1, only the components characterizing the present invention are shown whereas the other components are omitted.

Base stations 10-1~10-n form cells and exchange signals with mobile stations (not shown) residing in the cells.

When PCI is allocated to the target cell of target base station 10, maintenance terminal 20 is moved to the target cell by the maintainer, and measures the reception power or propagation loss of the signals (e.g., pilot signals, notification signals, etc.) received inside the target cell from each cell of adjacent base stations 10 in the neighborhood of target base station 10.

When PCI is allocated to the target cell of target base station 10, maintenance server 30, based on the result of maintenance terminal 20's measurement of the reception power or propagation loss of adjacent base stations 10, allocates PCI to the target cell. In this case, target base station 10 sets the target cell with the PCI that is allocated by maintenance server 30 and transmits the PCI to mobile stations residing inside the target cell.

Here, maintenance server 30 may be connected to base stations 10-1~10-n and maintenance terminal 20 in either a wired or a wireless manner, the mode of connection being not limited.

Now, the internal configurations of base stations 10-1~10-n, maintenance terminal 20 and maintenance server 30 will be described.

Base station 10-1 includes antenna 11, transmitter 12, and controller 13.

Antenna 11 is provided for each cell formed by base station 10-1. Here, in FIG. 1 a plurality of antennas 11 are shown, but the number of antennas 11 may be one. In this case, base station 10-1 forms a single cell (omni-cell).

Transmitter 12 transmits signals (e.g., pilot signals, notification signals, etc.) to mobile stations residing inside each cell of base station 10-1 via the antenna 11 corresponding to the cell.

Controller 13 performs control for transmitting signals from transmitter 12. For example, controller 13 sets the PCI allocated to each cell of base station 10-1 by maintenance server 30 to the cell and performs control so as to transmit a notification signal included with the PCI to the cell.

The configurations of other base stations 10-2~10-n are the same as that of base station 10-1.

Maintenance terminal 20 includes base station DB (Data Base) 21, antenna 22, mobile station receiver 23, and measuring unit 24.

Base station DB 21 is a data base in which, for each of base stations 10-1~10-n, the base station ID, cell number (different from PCI) and PCI of each cell of adjacent base stations 10 in the neighborhood of the base station 10 are registered.

Herein, maintenance terminal 20 is moved to the target cell by the maintainer when PCI is allocated to the target cell of target base station 10, as state above.

In this case, maintenance terminal 20 behaves similarly to the mobile stations residing inside the target cell and receives signals (e.g., pilot signals, notification signals, etc.) transmitted from each cell of target base station 10 and adjacent base stations 10 in the neighborhood of target base station 10, at mobile station receiver 23.

Measuring unit 24, among the signals received at mobile station receiver 23, measures the reception power or propagation loss of the signals received from adjacent base stations 10 in the neighborhood of target base station 10. Here, measuring unit 24, in measuring propagation loss, extracts the transmission power included in the notification signal first, then measures the reception power of the received signal, and determines the difference between the transmission power and the reception power as the propagation loss.

Maintenance server 30 includes base station DB 31 and allocator 32.

Base station DB 31 is a data base similar to base station DB 21.

When allocating PCI to the target cell of target base station 10, allocator 32 identifies the cell that has the greatest reception power or the lowest propagation loss (the first cell, estimated as the cell producing the strongest interference) from among the cells of adjacent base stations 10 in the neighborhood of target base station 10, based on the maintenance terminal 20's result of measurement of reception power or propagation loss.

Then, allocator 32 allocates a PCI in which the PSS code sequence number is different from that of the cell identified above and has not been allocated to any of the cells of adjacent base stations 10, to the target cell.

Next, the operation in the mobile communication system of the present exemplary embodiment when PCI is allocated to the target cell of target base station 10 will be described. It is assumed hereinbelow that maintenance terminal 20 measures reception power.

First, the operation of maintenance terminal 20 will be described with reference to FIG. 2.

Figure 2:
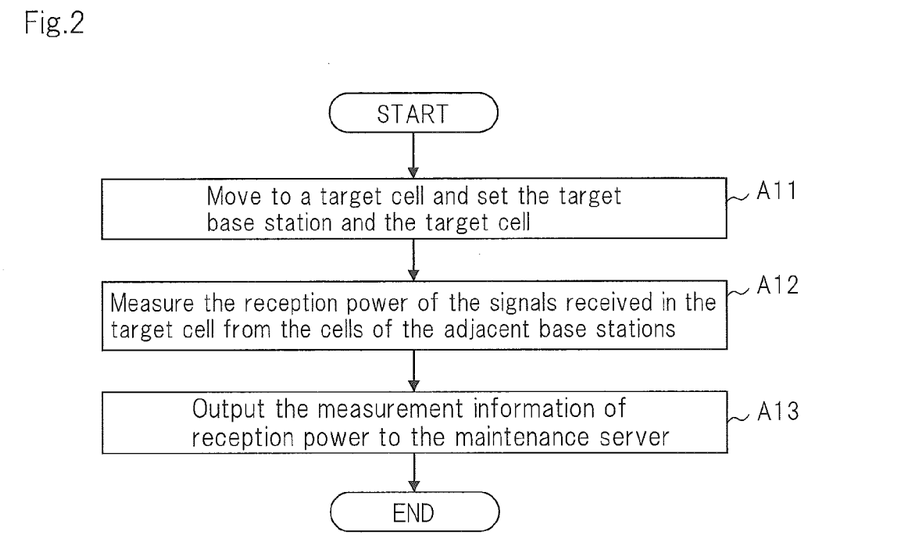
FIG. 2 A flow chart for explaining the operation of the maintenance terminal in the first to third exemplary embodiments of the present invention.

As shown in FIG. 2, when PCI is allocated to the target cell of target base station 10, maintenance terminal 20 is moved to the target cell by the maintainer, and the base station ID of target base station 10 and the cell number of the target cell are set in measuring unit 24 by the maintainer (Step A11).

Then, measuring unit 24 refers to base station DB 21 to confirm each cell of adjacent base stations 10 in the neighborhood of target base station 10 and measures the reception power of the signals received from the cells of adjacent base stations 10, among the signals received by mobile station receiver 23 (Step A12).

Thereafter, measuring unit 24 outputs the base station ID of target base station 10, the cell number of the target cell, and the cell number and result of measurement of the reception power of each cell of adjacent base stations 10 as the measurement information of reception power, to maintenance server 30 (Step A13).

Next, the operation of maintenance server 30 will be described with reference to FIG. 3.

Figure 3:
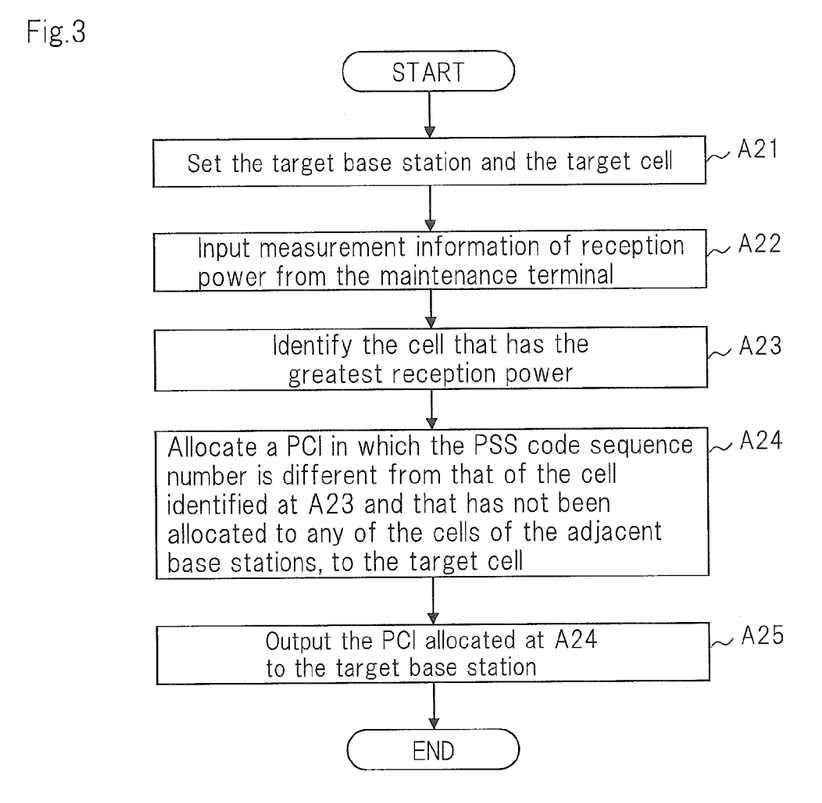
FIG. 3 A flow chart for explaining the operation of the maintenance server of the first exemplary embodiment of the present invention.

As shown in FIG. 3, when PCI is allocated to the target cell of target base station 10, the base station ID of target base station 10 and the cell number of the target cell are set in allocator 32 of maintenance server 30 by the maintainer (Step A21).

When, in this state, the measurement information of reception power is input from maintenance terminal 20 (Step A22), allocator 32 refers to base station DB 31 to confirm the cells of adjacent base stations 10 in the neighborhood of target base station 10. Next, allocator 32 identifies the cell that has the greatest reception power (the first cell, estimated as the cell producing the strongest interference) from among the cells of adjacent base stations 10, based on the measurement information of reception power (Step A23).

Next, allocator 32 refers to base station DB 31 to confirm the PSS code sequence number allocated to the cell that has been identified at Step A23, and also to confirm the PCI allocated to each cell of adjacent base stations 10. Next, allocator 32 allocates a PCI in which the PSS code sequence number is different from that of the cell identified at Step A23 and has not been allocated to any of the cells of adjacent base stations 10, to the target cell (Step A24).

Thereafter, allocator 32 outputs the PCI allocated to the target cell at Step A24 and the cell number of the target cell, to target base station 10 (Step A25).

Here, registration of the PCI allocated to the target cell at Step A24 into base station DB 31 and base station DB 21 may be performed at any timing after Step A24.

Next, the operation of base station 10 will be described with reference to FIG. 4.

Figure 4:
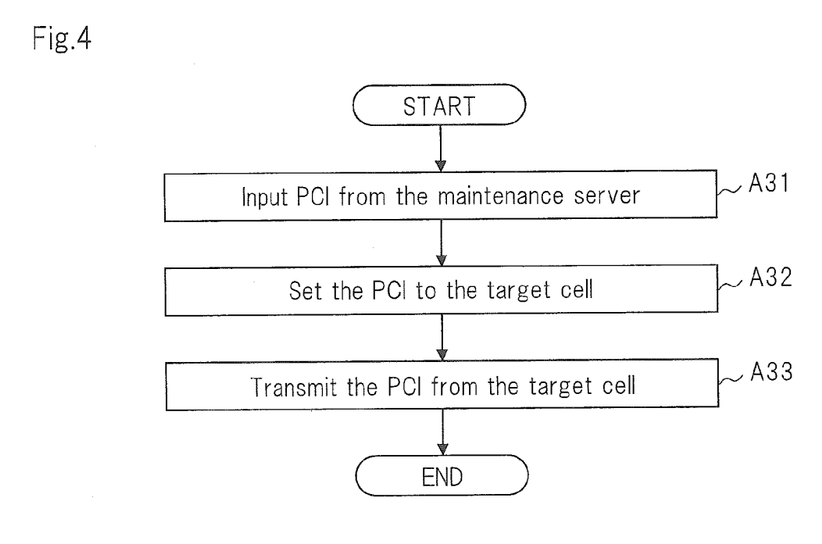
FIG. 4 A flow chart for explaining the operation of the base station in the first to third exemplary embodiments of the present invention.

As shown in FIG. 4, when receiving the PCI allocated to its own station from maintenance server 30 (Step A31), controller 13 sets the PCI to the target cell (Step A32).

Then, transmitter 12 transmits a notification signal included with the PCI to mobile stations residing inside the target cell of its own station via antenna 11 corresponding to the target cell (Step A33).

As described, in this exemplary embodiment, the cell that has the greatest reception power or the lowest propagation loss (estimated as the cell producing the strongest interference) is identified from among the cells of adjacent base stations 10 in the neighborhood of target base station 10, and a PCI, in which the PSS code sequence number is different from that of the identified cell and has not been allocated to any of the cells of adjacent base stations 10, is allocated to the target cell.

Accordingly, the target cell shows high orthogonality between the PSSs of itself and the adjacent cell that is estimated to produce the strongest interference and hence it receives less interfered from adjacent cell, so that it is possible to obtain the effect that degradation of the mobile station's cell search characteristic can be avoided.

(2) The Second Exemplary Embodiment

In this exemplary embodiment, the PCI allocating operation in the first exemplary embodiment is specified to the operation in case that base stations 10-1~10-n have a three-cell structure consisting of three cells. In this exemplary embodiment, the overall configuration of the mobile communication system, the operations of base stations 10-1~10-n and the operation of maintenance terminal 20 are the same as those of the first exemplary embodiment.

Accordingly, the following description will focus on the operation of maintenance server 30. Also, it is assumed that maintenance terminal 20 measures reception power.

Figure 5:
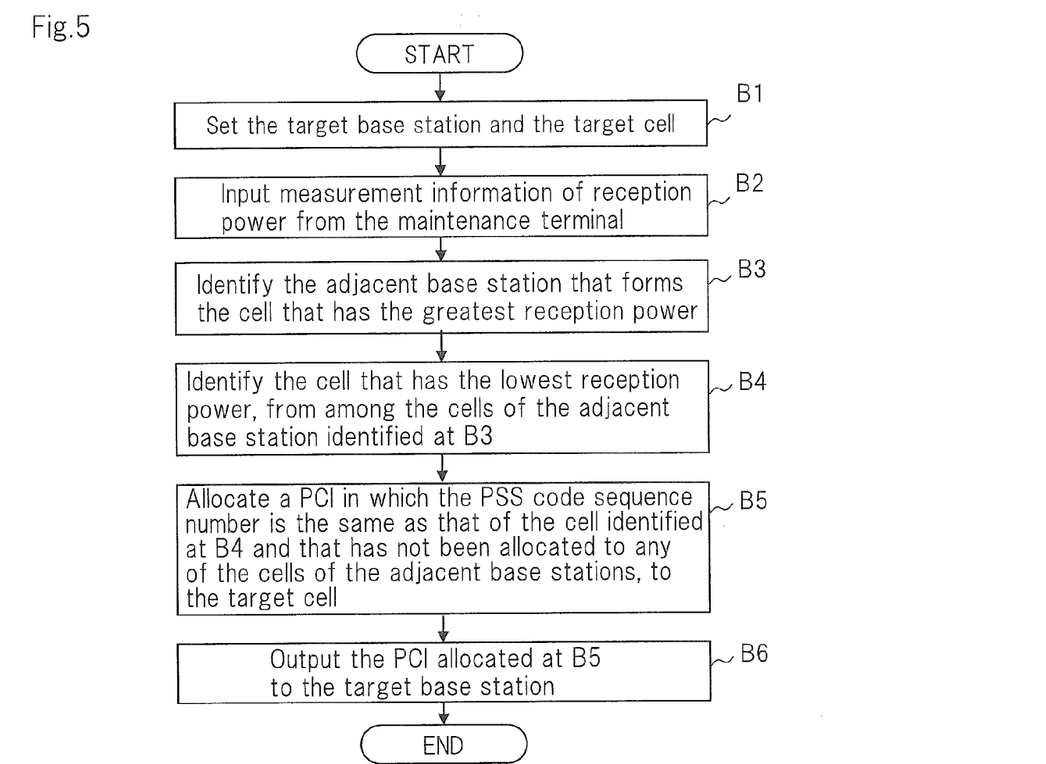
FIG. 5 A flow chart for explaining the operation of the maintenance server of the second exemplary embodiment of the present invention.

As shown in FIG. 5, when PCI is allocated to the target cell of target base station 10, the base station ID of target base station 10 and the cell number of the target cell are set in allocator 32 of maintenance server 30 by the maintainer (Step B1).

When, in this state, the measurement information of reception power is input from maintenance terminal 20 (Step B2), allocator 32 refers to base station DB 31 to confirm the cells of adjacent base stations 10 in the neighborhood of target base station 10. Next, allocator 32 identifies the cell that has the greatest reception power (the first cell, estimated as the cell producing the strongest interference) from among the cells of adjacent base stations 10, based on the measurement information of reception power, and also identifies the adjacent base station 10 that forms the identified cell (estimated as the nearest adjacent base station) (Step B3).

Then, allocator 32 identifies the cell that has the lowest reception power (the second cell, estimated as the cell having a directivity that produces the weakest interference) from among the cells formed by the adjacent base station 10 identified at Step B3, based on the measurement information of reception power (Step B4).

Next, allocator 32 refers to base station DB 31 to confirm the PSS code sequence number allocated to the cell that has been identified at Step B4 and also to confirm the PCI allocated to each cell of adjacent base stations 10. Next, allocator 32 allocates a PCI in which the PSS code sequence number is the same as that of the cell identified at Step B4 and that has not been allocated to any of the cells of adjacent base stations 10, to the target cell (Step B5).

Thereafter, allocator 32 outputs the PCI allocated to the target cell at Step B5 and the cell number of the target cell, to target base station 10 (Step B6).

Figure 6:
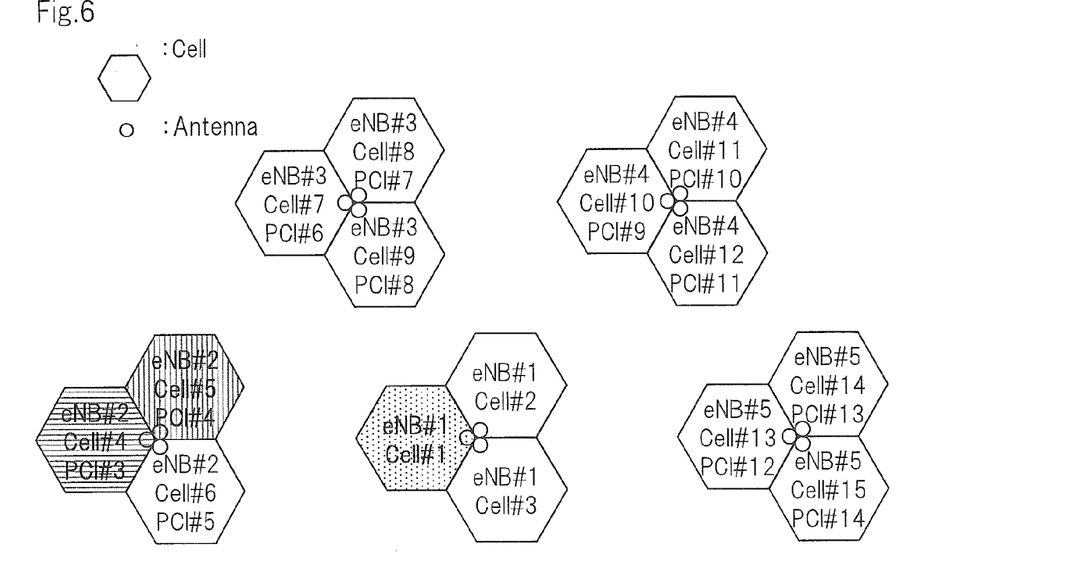
FIG. 6 A diagram for explaining a specific example of the operation of the mobile communication system of the second exemplary embodiment of the present invention.

Subsequently, a specific example of the operation of the mobile communication system of the present exemplary embodiment will be described with reference to FIG. 6. Here, it is assumed in FIG. 6 that base stations (#2~#5) 10-2~10-5 are located adjacent to base station (#1) 10-1. The text strings in the regular hexagon representing a cell denote "base station ID (written as eNB#)", "cell number (written as Cell#)" and "PCI" (the same notation is used in FIG. 8 below).

It is assumed hereinbelow that PCI is allocated to cell #1 of base station(#1) 10-1.

Step b1:

First, measuring unit 24 of maintenance terminal 20 measures the reception power of the signal received from each of the cells of base stations (#2~#5) 10-2~10-5, inside cell #1 of base station(#1) 10-1. Herein, it is assumed that the following measurement result is obtained.

Cell #4 of base station (#2) 10-2: −110 dBm
Cell #5 of base station (#2) 10-2: −79 dBm
Cell #6 of base station (#2) 10-2: −80 dBm
Cell #7 of base station (#3) 10-3: −80 dBm
Cell #8 of base station (#3) 10-3: −90 dBm
Cell #9 of base station (#3) 10-3: −100 dBm
Cell #10 of base station (#4) 10-4: −90 dBm
Cell #11 of base station (#4) 10-4: −100 dBm
Cell #12 of base station (#4) 10-4: −100 dBm
Cell #13 of base station (#5) 10-5: −110 dBm
Cell #14 of base station (#5) 10-5: −120 dBm
Cell #15 of base station (#5) 10-5: −120 dBm Step b2:

Next, allocator 32 of maintenance server 30 identifies base station (#2) 10-2 that forms cell #5 that has the greatest reception power (−79 dBm), from among base stations (#2~#5) 10-2~10-5.

Step b3:

Then, allocator 32 of maintenance server 30 identifies cell #4 of the lowest reception power (−110 dBm, PCI#3(mod 3 (code sequence number) is 0), from among the cells of base station (#2) 10-2.

Step b4:

Thereafter, allocator 32 of maintenance server 30 allocates PCI#0, which has mod 3 equal to 0 and which has not been allocated to any of the cells of base stations (#2~#5) 10-2~10-5, to cell #1 of base station (#1) 10-1.

As described, in the exemplary embodiment, when PCI is allocated to the target cell of target base station 10, adjacent base station 10 (estimated as the nearest adjacent base station 10) that forms the cell that has the greatest reception power or the lowest propagation loss (estimated as the cell producing the strongest interference) is identified from among adjacent base stations 10 in the neighborhood of target base station 10, the cell that has the lowest reception power or the greatest propagation loss (estimated as the cell having a directivity that produces the weakest interference) is identified from among the cells formed by the identified adjacent base station 10, and a PCI, in which the PSS code sequence number is the same as that of the identified cell and that has not been allocated to any of the cells of adjacent base stations 10, is allocated to the target cell.

Accordingly, the target cell shows high orthogonality the PSSs of itself and the adjacent cell that is estimated to produce the strongest interference and hence it receives less interfered from adjacent cell, so that it is possible to obtain the effect in which degradation of the mobile station's cell search characteristic can be avoided.

(3) The Third Exemplary Embodiment

In the second exemplary embodiment, there is a possibility that the same PSS code sequence number is allocated to the cells formed by the identical base station 10. In this case, the PSSs of the cells formed by the identical base station 10 will greatly interfere with each other.

To deal with this, in the present exemplary embodiment, when PCI is allocated to plural cells formed by identical base station 10, the cell whose reception power is greater or whose propagation loss is smaller is given priority to be allocated with PCI so that no overlap of the PSS code sequence numbers will occur between the cells.

In this exemplary embodiment, the PCI allocating operation in the first exemplary embodiment is specified to the operation in case that base stations 10-1~10-n have a three-cell structure. In this exemplary embodiment, the overall configuration of the mobile communication system is the same as that of the first exemplary embodiment.

Further, the operation of maintenance terminal 20 is the same as that of the first exemplary embodiment. However, in the case of the present exemplary embodiment, maintenance terminal 20 is successively moved to the three target cells formed by target base station 10, and sequentially outputs the measurement information of the reception power or propagation loss of each target cell to maintenance server 30.

Also, base stations 10-1~10-n operate in the same manner as in the first exemplary embodiment. However, in the present exemplary embodiment, when base stations 10-1~10-n play a role of target base station 10, the base station receives input of the PCIs of the three target cells formed by its own station from maintenance server 30 and sets up the PCIs to the target cells and transmits each PCI to mobile stations residing inside the associated target cell.

Accordingly, the following description will focus on the operation of maintenance server 30. Also, it is assumed that maintenance terminal 20 measures reception power.

Figure 7:
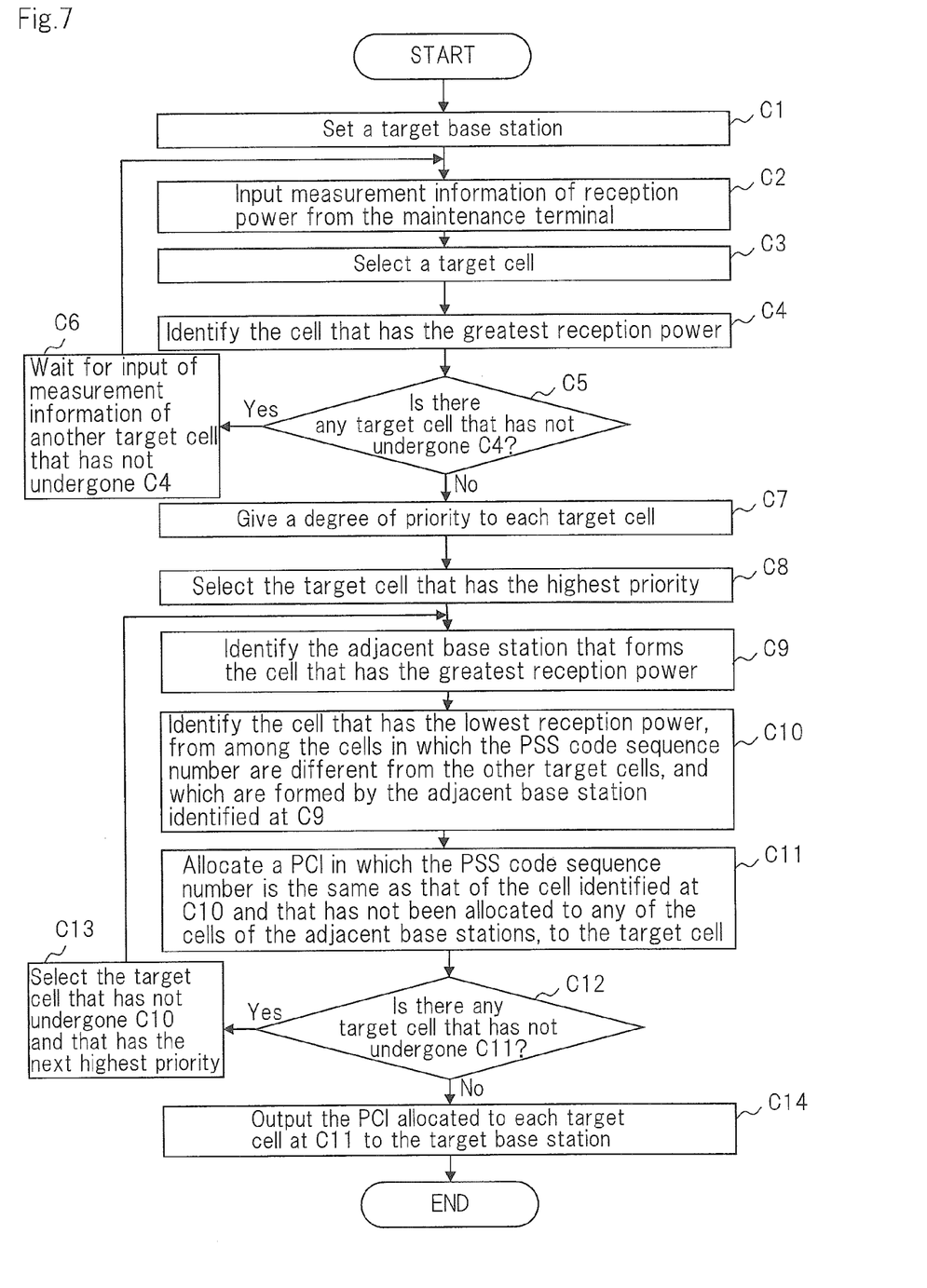
FIG. 7 A flow chart for explaining the operation of the maintenance server of the third exemplary embodiment of the present invention.

As shown in FIG. 7, when it is assumed that the three cells formed by target base station 10 are the target cells to which PCI is allocated, the base station ID of target base station 10 is set in allocator 32 of maintenance server 30 by the maintainer (Step C1).

When, in this state, the measurement information of reception power is input from maintenance terminal 20 (Step C2), allocator 32 refers to base station DB 31 to confirm the target cells of target base station 10, also to confirm the cells of adjacent base stations 10 in the neighborhood of target base station 10, and selects the target cells whose measurement information has been input, from among the target cells of target base station 10 (Step C3).

Next, allocator 32, for the target cells selected at Step C3, identifies the cell that has the greatest reception power (the first cell, estimated as the cell producing the strongest interference) based on the measurement information of reception power, from among the cells of adjacent base stations 10 (Step C4).

Then, allocator 32 executes Step C4 for all the target cells of target base station 10 so as to determine whether the cell that has the greatest reception power has been identified (Step C5).

At Step C5, if there is a target cell that has not undergone Step C4, the control waits for a new input of measurement information of an untreated target cell at Step C2 (Step C6), whereas if all the target cells have undergone Step C4, the control goes to Step C7.

At Step C7, allocator 32 gives priority to the target cells of target base station 10, in descending order of the reception power of the cell identified at Step C4.

Next, allocator 32 selects the target cell that has the highest priority from among the target cells of target base station 10 (Step C8), and identifies the adjacent base station 10 that forms the cell identified at Step C4 (estimated as the nearest adjacent base station 10), for the selected target cell (Step C9).

Next, allocator 32 identifies the cell that has the lowest reception power (the second cell, estimated as the cell having a directivity that produces the weakest interference) based on the measurement information of reception power, from among the cells in which the PSS code sequence number is different from the other target cells, and which are formed by the adjacent base station 10 identified at Step C9 (Step C10). Here, at Step C10 when the cell is the target cell that has the highest priority, no PCI will have been allocated at this time, so that the cell that has the lowest reception power is identified from among the cells formed by adjacent base station 10 without taking PSS into account.

Next, allocator 32 refers to base station DB 31 to confirm the PSS code sequence number allocated to the cell identified at Step C10 and also to confirm PCI allocated to each cell of adjacent base stations 10. Then, allocator 32 allocates a PCI in which the PSS code sequence number is the same as that of the cell identified at Step C10 and that has not been allocated to any of the cells of adjacent base stations 10, to the target cell (Step C11).

Next, allocator 32 executes Step C11 for all the target cells of target base station 10 so as to determine whether PCI has been allocated (Step C12).

At Step C12, if there is a target cell that has not undergone Step C11, the target cell that has been untreated and that has the next high priority is selected (Step C6), and the control returns to Step C9, whereas if all the target cells have undergone Step C11, the control goes to Step C14.

Thereafter, allocator 32 outputs the PCI allocated to each target cell of target base station 10 at Step C11 and the cell number of each target cell to target base station 10, at Step C14.

Figure 8:
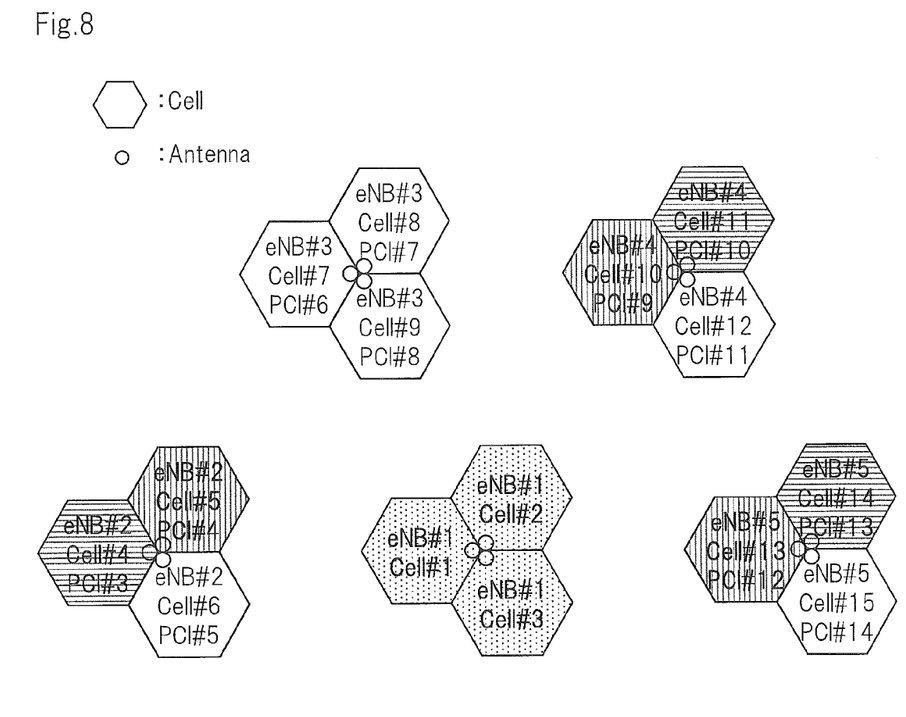
FIG. 8 A diagram for explaining a specific example of the operation of the mobile communication system of the third exemplary embodiment of the present invention.

Subsequently, a specific example of the operation of the mobile communication system of the present exemplary embodiment will be described with reference to FIG. 8.

Hereinbelow, PCI will be allocated to each of cells #1~#3 of base station (#1) 10-1.

Step c1:

First, measuring unit 24 of maintenance terminal 20 measures the reception power of the signal received from each of the cells of base stations (#2~#5) 10-2~10-5, inside respective cells #1, #2 and #3 of base station (#1) 10-1.

Step c2:

Next, allocator 32 of maintenance server 30 identifies the cell that has the greatest reception power for each of cells #1, #2 and #3. Herein, it is assumed that identification was done as follows:

Cell #1: cell #5(PCI#4) of base station (#2) 10-2: −79 dBm
Cell #2: Cell #10(PCI#9) of base station (#4) 10-4: −90 dBm
Cell #3: Cell #13(PCI#12) of base station (#5) 10-5: −85 dBm Step c3:

Next, allocator 32 of maintenance server 30 gives priority to cells #1, #2 and #3, in descending order of the reception power of the cell identified at Step c2. It is assumed herein that priority was given in the following order.

Cell #1, >Cell #3>Cell #2

Step c4:

Thereafter, allocator 32 of maintenance server 30 allocates PCI to each of cells #1, #2 and #3 in the order of priority.

Step c4-(1):

First, for cell #1, allocator 32 identifies the cell that has the lowest reception power, from among the cells of base station (#2) 10-2 that forms cell #5 identified at Step c2. Herein, it is assumed that the identification is done, as follows.

Cell #4 of base station (#2) 10-2, −110 dBm, PCI#3(mod is 3).

Accordingly, allocator 32 allocates PCI#0, which has mod 3 equal to 0 and which has not been allocated to any of the cells of base stations (#2~#5) 10-2~10-5, to cell #1 of base station (#1) 10-1.

Step c4-(2):

Next, for cell #3, allocator 32 identifies the cell that has the lowest reception power, from among the cells which have been allocated with other than 0 for mod 3, and which are formed by base station (#5) 10-5 that forms cell #13 identified at Step c2. Herein, it is assumed that the identification is done, as follows.

Cell #14 of base station (#5) 10-5, −120 dBm, PCI#13(mod is 1).

Accordingly, allocator 32 allocates PCI#15, which has mod 3 equal to 1 and which has not been allocated to any of the cells of base stations (#2~#5) 10-2~10-5, to cell #3 of base station (#1) 10-1.

Step c4-(3):

Next, for cell #2, allocator 32 identifies the cell that has the lowest reception power, from among the cells which have been allocated with other than 0 and 1 (i.e., 2) for mod 3, and which are formed by base station (#4) 10-4 that forms cell #10 identified at Step c2. Herein, it is assumed that the identification is done, as follows.

Cell #11 of base station (#4) 10-4, −124 dBm, PCI#10(mod is 2).

Accordingly, allocator 32 allocates PCI#16, which has mod 3 equal to 2 and which has not been allocated to any of the cells of base stations (#2~#5) 10-2~10-5, to cell #2 of base station (#1) 10-1.

As described above, in the present exemplary embodiment, when PCI is allocated to a plurality of target cells formed by target base station 10, PCI is allocated by giving priority to the cell that has a greater reception power or lower propagation loss so as to avoid overlapping of the PSS code sequence number between cells.

As a result, it is possible to obtain such an effect as to avoid interference between PSSs from increasing due to overlap of the PSS code sequence number, between the cells formed by the same base station 10.

The other effects are the same as those in the first and second exemplary embodiments.

(4) The Fourth Exemplary Embodiment

Figure 9:
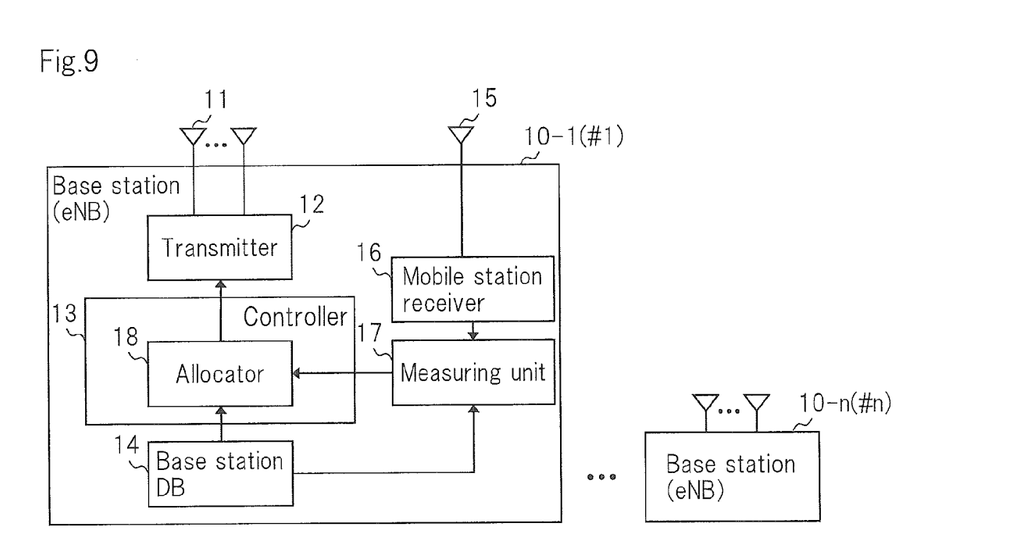
FIG. 9 A block diagram showing the configuration of a mobile communication system of the fourth exemplary embodiment of the present invention.

As shown in FIG. 9, the mobile communication system of this exemplary embodiment is different from the first to third exemplary embodiments in that the functions of maintenance terminal 20 and maintenance server 30 are provided in base stations 10-1~10-$n$ and in that maintenance terminal 20 and maintenance server 30 are omitted.

That is, base station 10-1 additionally includes antenna 15, mobile station receiver 16 and measuring unit 17 corresponding to antenna 22, mobile station receiver 23 and measuring unit 24 provided in maintenance terminal 20. Base station 10-1 further includes base station DB 14 corresponding to base station DB 21 provided in maintenance terminal 20 and base station DB 31 provided in maintenance server 30. Further added to inside controller 13 of base station 10-1 is allocator 18 corresponding to allocator 32 provided in maintenance server 30.

The configuration of other base stations 10-2~10-$n$ are the same as that of base station 10-1.

The present exemplary embodiment is different only in that the functions of maintenance terminal 20 and maintenance server 30 are provided in base stations 10-1~10-$n$ whereas the basic operation is unchanged, so that description of the operation is omitted.

As described above, in the present embodiment, base stations 10-1~10-$n$ measure the reception power or propagation loss from each of the cells of adjacent base stations 10 in the neighborhood of its own station and allocate PCI to each of its own station. As a result, it is possible to obtain such an effect as to make base stations 10-1~10-$n$ to operate as SON (Self Organizing Network).

The other effects are the same as those of the first to third exemplary embodiments.

Although the present invention has been explained with reference to the exemplary embodiments, the present invention should not be limited to the above exemplary embodiments. Various modifications that can be understood by those skilled in the art may be made to the structures and details of the present invention within the scope of the present invention.

For example, the above embodiments were described by giving examples using PSS as the synchronization signal. However, other synchronization signals than PSS may be used.

Specifically, for the adjacent cell that is estimated to produce the greatest interference with the target cell, the code sequence number (e.g., a Gold sequence) of SSS (Secondary Synchronization Signal) may be made different so as to enhance the orthogonality between SSSs of the target cell and the adjacent cell, whereby it is possible to adequately reduce the interference from the adjacent cell.

Also, the second and third exemplary embodiments were described by giving examples in which base stations 10-1~10-$n$ have a three-cell structure, but the number of cells formed by base stations 10-1~10-$n$ is not limited to this.

This application claims priority based on Japanese Patent Application No. 2011-257614, filed on Nov. 25, 2011, and should incorporate all the disclosure thereof herein.

The invention claimed is:

1. A cell identifier allocation method for allocating a cell identifier to a target cell of a target base station among a plurality of base stations, the cell identifier allocation method comprising:

measuring a reception power or a propagation loss of a signal received inside the target cell from each of cells of adjacent base stations in a neighborhood of the target cell;

identifying a first cell that has a greatest reception power or a lowest propagation loss, from among the cells of the adjacent base stations; and allocating a cell identifier in which a code sequence number of a synchronization signal is different from that of the first cell and that has not been allocated to any of the cells of the adjacent base stations, to the target cell, wherein each of the plurality of base stations forms a plurality of cells, wherein the identifying of the first cell includes:

when plural cells of the target base station are handled as target cells, identifying the first cell for each of the target cells, and wherein the allocating of the cell identifier includes:

when plural cells of the target base station are handled as the target cells, giving priority to the each of target cells, in a descending order of the reception power of the first cell, or in an ascending order of the propagation loss of the first cell;

for each of the target cells, in an order of the highest priority, identifying a second cell that has the lowest reception power or the greatest propagation loss, from among the cells in which the code sequence number of the synchronization signal is different from that of the other target cells, and which are formed by one of the adjacent base stations that forms the first cell; and for each of the target cells, in an order of the highest priority, allocating a cell identifier in which the code sequence number of the synchronization signal is the same as that of the second cell and that has not been allocated to any of the cells of the adjacent base stations, to each of the target cells.

2. The cell identifier allocation method according to claim 1, wherein, in the measurement, a separate device from the target base station receives signals inside the target cell from each of the cells of the adjacent base stations and measures the reception power or propagation loss of the received signal.

3. The cell identifier allocation method according to claim 1, wherein, in the measurement, the target base station receives signals inside the target cell from each of the cells of the adjacent base stations and measures the reception power or propagation loss of the received signal.

4. The cell identifier allocation method according to claim 1, wherein the first cell has the greatest reception power among the cells of the adjacent base stations.

5. The cell identifier allocation method according to claim 1, wherein the first cell has a greatest interference against the target cell among the cells of the adjacent base stations.

6. A cell identifier allocation method for allocating a cell identifier to a target cell of a target base station among a plurality of base stations, the cell identifier allocation method comprising:
  identifying a first cell that produces a greatest interference against the target cell, from among cells of adjacent base stations in a neighborhood of the target base station; and
  allocating a cell identifier in which a code sequence number of a synchronization signal is different from that of the first cell and that has not been allocated to any of the cells of the adjacent base stations, to the target cell,
  wherein each of the plurality of base stations forms a plurality of cells,
  wherein the identifying of the first cell includes:
    when plural cells of the target base station are handled as target cells, identifying the first cell for each of the target cells, and
  wherein the allocating of the cell identifier includes:
    when plural cells of the target base station are handled as the target cells, giving priority to the each of target cells, in a descending order of the reception power of the first cell, or in an ascending order of the propagation loss of the first cell;
    for each of the target cells, in an order of the highest priority, identifying a second cell that has the lowest reception power or the greatest propagation loss, from among the cells in which the code sequence number of the synchronization signal is different from that of the other target cells, and which are formed by one of the adjacent base stations that forms the first cell; and
    for each of the target cells, in an order of the highest priority, allocating a cell identifier in which the code sequence number of the synchronization signal is the same as that of the second cell and that has not been allocated to any of the cells of the adjacent base stations, to each of the target cells.

7. The cell identifier allocation method according to claim 6, wherein the first cell has a greatest reception power among the cells of the adjacent base stations.

8. The cell identifier allocation method according to claim 6, wherein the first cell has a lowest propagation loss among the cells of the adjacent base stations.

9. A base station that allocates a cell identifier to a target cell thereof among a plurality of base stations, the base station comprising:
  a measuring unit that measures a reception power or a propagation loss of a signal received inside the target cell from among cells of adjacent base stations in a neighborhood of its own station; and
  an allocator that identifies a first cell that has a greatest reception power or a lowest propagation loss, from among the cells of the adjacent base stations, and allocates a cell identifier in which a code sequence number of a synchronization signal is different from that of the first cell and that has not been allocated to any of the cells of the adjacent base stations, to the target cell,
  wherein each of the plurality of base stations forms a plurality of cells,
  wherein the allocator identifies the first cell such that, when plural cells of the target base station are handled as target cells, the first cell for each of the target cells is identified, and
  wherein the allocator allocated the cell identifier such that:
    when plural cells of the target base station are handled as the target cells, priority to the each of target cells is given, in a descending order of the reception power of the first cell, or in an ascending order of the propagation loss of the first cell;
    for each of the target cells, in an order of the highest priority, a second cell that has the lowest reception power or the greatest propagation loss is identified, from among the cells in which the code sequence number of the synchronization signal is different from that of the other target cells, and which are formed by one of the adjacent base stations that forms the first cell; and
    for each of the target cells, in an order of the highest priority, a cell identifier in which the code sequence number of the synchronization signal is the same as that of the second cell and that has not been allocated to any of the cells of the adjacent base stations is allocated, to each of the target cells.

10. The base station according to claim 9, wherein the first cell has the greatest reception power among the cells of the adjacent base stations.

11. The base station according to claim 9, wherein the first cell has a greatest interference against the target cell among the cells of the adjacent base stations.

12. A maintenance server that allocates a cell identifier to a target cell of a target base station among a plurality of base stations, the maintenance server comprising:
  an allocator that identifies, from among cells of adjacent base stations in a neighborhood of the target base station, a first cell whose reception power of a signal received inside the target cell is a greatest or whose propagation loss of the signal received inside the target cell is a lowest, and allocates a cell identifier in which a code sequence number of a synchronization signal is different from that of the first cell and that has not been allocated to any of the cells of the adjacent base stations, to the target cell,
  wherein each of the plurality of base stations folios a plurality of cells,
  wherein the allocator identifies the first cell such that, when plural cells of the target base station are handled as target cells, the first cell for each of the target cells is identified, and
  wherein the allocator allocated the cell identifier such that:
    when plural cells of the target base station are handled as the target cells, priority to the each of target cells is given, in descending order of the reception power of the first cell, or in an ascending order of the propagation loss of the first cell;
    for each of the target cells, in an order of the highest priority, a second cell that has the lowest reception power or the greatest propagation loss is identified, from among the cells in which the code sequence number of the synchronization signal is different from that of the other target cells, and which are formed by one of the adjacent base stations that forms the first cell; and for each of the target cells, in an order of the highest priority, a cell identifier in which the code sequence number of the synchronization signal is the same as that of the second cell and that has not been allocated to any of the cells of the adjacent base stations is allocated, to each of the target cells.

13. The maintenance server according to claim 12, wherein the first cell has the greatest reception power among the cells of the adjacent base stations.

14. The maintenance server according to claim 12, wherein the first cell has a greatest interference against the target cell among the cells of the adjacent base stations.

15. A mobile communication system including a plurality of base stations and that allocates a cell identifier to a target cell of a target base station among the plural base stations, the mobile communication system comprising:

a measuring unit that measures a reception power or a propagation loss of a signal received inside the target cell from each of cells of adjacent base stations in a neighborhood of the target base station; and an allocator that identifies a first cell that has a greatest reception power or a lowest propagation loss, from among the cells of the adjacent base stations, and allocates a cell identifier in which a code sequence number of a synchronization signal is different from that of the first cell and that has not been allocated to any of the cells of the adjacent base stations, to the target cell, wherein each of the plurality of base stations forms a plurality of cells, wherein the allocator identifies the first cell such that, when plural cells of the target base station are handled as target cells, the first cell for each of the target cells is identified, and wherein the allocator allocated the cell identifier such that:

when plural cells of the target base station are handled as the target cells, priority to the each of target cells is given, in a descending order of the reception power of the first cell, or in an ascending order of the propagation loss of the first cell;

for each of the target cells, in an order of the highest priority, a second cell that has the lowest reception power or the greatest propagation loss is identified, from among the cells in which the code sequence number of the synchronization signal is different from that of the other target cells, and which are formed by one of the adjacent base stations that forms the first cell; and for each of the target cells, in an order of the highest priority, a cell identifier in which the code sequence number of the synchronization signal is the same as that of the second cell and that has not been allocated to any of the cells of the adjacent base stations is allocated, to each of the target cells.

16. The mobile communication system according to claim 15, wherein the first cell has the greatest reception power among the cells of the adjacent base stations.

17. The mobile communication system according to claim 15, wherein the first cell has a greatest interference against the target cell among the cells of the adjacent base stations.

18. The mobile communication system according to claim 15, wherein the first cell has the lowest propagation loss among the cells of the adjacent base stations.

* * * * *